June 1, 1937.  A. J. GRANBERG  2,082,392
APPARATUS TO CALIBRATE METERS TO COMPENSATE FOR TEMPERATURE VARIATIONS
Filed May 11, 1936
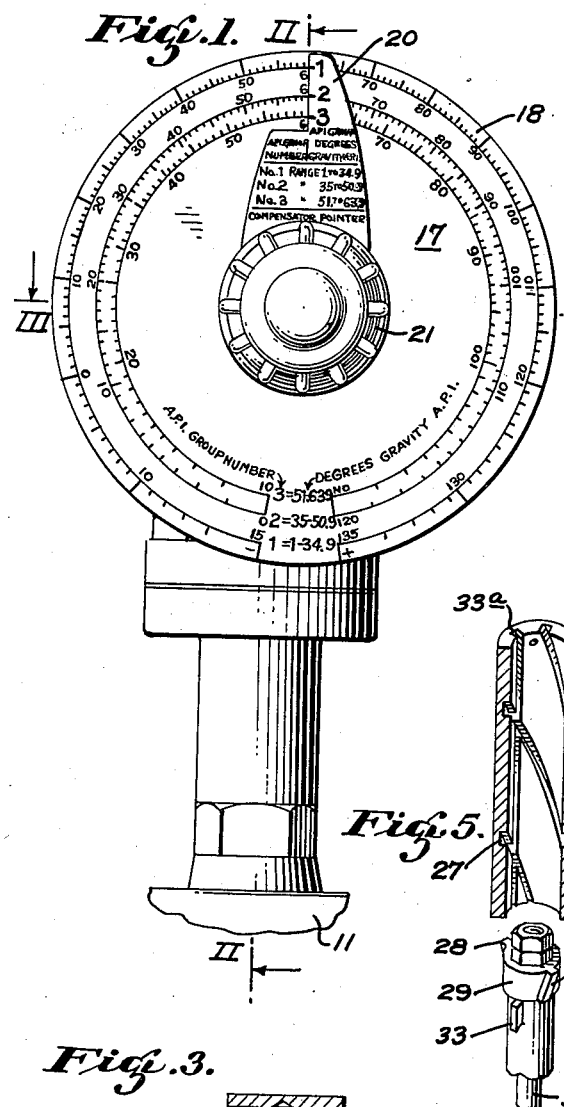
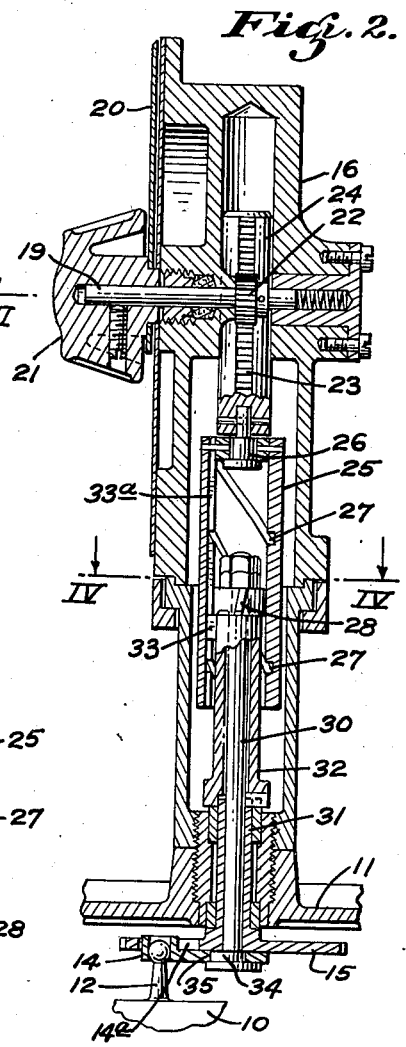
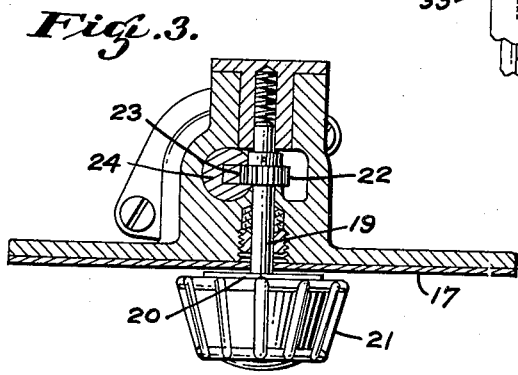
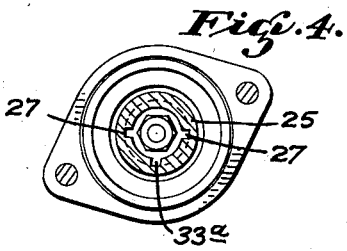
INVENTOR.
Albert J. Granberg
BY Oscar A. Mellin
ATTORNEY.

Patented June 1, 1937

2,082,392

UNITED STATES PATENT OFFICE 2,082,392

APPARATUS TO CALIBRATE METERS TO COMPENSATE FOR TEMPERATURE VARIATIONS

Albert J. Granberg, Berkeley, Calif., assignor to Ralph N. Brodie Company, Oakland, Calif., a corporation of California Application May 11, 1936, Serial No. 79,185

5 Claims. (Cl. 73—242)

This invention relates to liquid meters and particularly pertains to a calibrating device for liquid meters of the displacement type.

It is a well known fact that such liquids as gasoline expand and contract with changes in temperature. Consequently, in the trade it is sold by volume at an average temperature of sixty degrees. If the gasoline to be delivered exceeds this temperature, the customer receives a greater volume than he would have at sixty degrees, and if it is below this temperature, he receives a lesser volume.

It is the principal object of my present invention to provide an improved calibrating apparatus for liquid meters of the displacement type by means of which the meter may be expeditiously and accurately calibrated so that it will compensate for the expansion or the contraction of the liquid to be metered.

I accomplish this object by providing a dial calibrated in degrees of temperature and with which a manually operative pointer cooperates. This pointer is operatively associated with the displacement adjustment device of the meter, and the relationship between the dial pointer and adjustment device is such that by aligning the pointer with the temperature reading on the dial corresponding with the temperature of the liquid to be metered, the meter will be automatically adjusted to deliver that volume of liquid which at sixty degrees temperature would agree with the volume desired to be delivered.

One form which the invention may assume is exemplified in the following description and illustrated by way of example in the accompanying drawing, in which:

Fig. 1 is a view in elevation of a meter calibrating device embodying the preferred form of my invention.

Fig. 2 is a central vertical section through the device taken on line II—II of Fig. 1.

Fig. 3 is a transverse sectional view through the dial and associated mechanism taken on line III—III of Fig. 1.

Fig. 4 is a transverse sectional view taken on line IV—IV of Fig. 2.

Fig. 5 is a perspective view of the actuator sleeve and adjustment shaft.

Referring more particularly to the accompanying drawing, I have there illustrated a calibrating device for liquid meters of the displacement type, particularly that type of meter which includes a piston which both reciprocates and oscillates during its operative cycle. In the drawing, 10 indicates such a piston and 11 the meter housing, in which the piston is mounted. In this type of meter the piston 10 is fitted with a radially extending crank arm 12 which engages an adjustable socket 14 mounted at an eccentric point in a rotatable gear 15, which gear is connected to a counter which translates the strokes of the piston into volume of liquid delivered through the meter. It is obvious that by adjusting the radial position of the socket 14 with respect to the center of the gear 15 that the stroke of the piston will be changed so that the volume displaced thereby will be varied.

This mounting of a piston and adjusting the displacement of the meter is old and well known in commercial meters known as the "Universal" meters and "Brodie" meters.

My present invention is particularly concerned with a mechanism for adjusting the position of the socket 14 with respect to the center of the gear 15 in such a manner as to compensate for changes in volume of liquid to be metered caused by temperature changes thereof.

As has been previously pointed out, such liquids as gasoline are usually sold at sixty degrees temperature; that is to say, if a customer orders one thousand gallons of gasoline, he is entitled to receive one thousand gallons at sixty degrees temperature. If the temperature of the gasoline is above sixty degrees, the customer will receive an amount of gasoline which, when its temperature is reduced to sixty degrees, will correspond to the amount ordered. Likewise, if the temperature of the gasoline is less than sixty degrees, he will receive an amount which, when its temperature is raised to sixty degrees, will correspond to the amount ordered.

In order that the meter may be quickly calibrated so that it will deliver a volume of fluid which at sixty degrees temperature will correspond with the amount ordered, I have provided my present calibrating device. This device includes a housing 16 fixed to the meter casing as illustrated in Fig. 2. Mounted at the upper portion of this housing 16 is a dial 17 which is provided with a scale 18 calibrated in degrees of temperature. Arranged coaxially of this dial and supported by suitable bearings in the housing 16 is a pointer shaft 19 on which is fixed a pointer 20. A knob 21 is likewise secured on the shaft 19 so that it may be turned manually to align the pointer 20 with any selected calibration on the scale 18. Also secured on the dial shaft 19 within the housing is a pinion 22 which is in mesh with a rack 23 formed on a reciprocable but non-rotatable plunger 24. It will be noticed from Fig. 2 that this plunger is guided for its reciprocable movement in the housing 16.

Extending coaxially from the lower end of the plunger 24 is a hollow cylindrical actuator sleeve 25. The upper end of this sleeve is connected to the lower end of the plunger 24 by a swivel connection 26. This connection causes the sleeve 25 to move axially with the plunger 24 but enables it to rotate relative to the plunger. The sleeve 25 is formed with two helical grooves 27 which are engaged with two helical splines 28 formed on a collar 29 secured on an adjusting shaft 30.

Referring more particularly to Fig. 2, it will be seen that the gear 15 is provided with a fixed hub 31 which in turn is fixed to a hollow trunnion 32, which extends upwardly into the actuator sleeve 25. This trunnion is formed with a fixed spline 33 at its exterior which is in sliding engagement with a straight guide slot 33a formed interiorly of the actuator sleeve 25 so that while the actuator sleeve 25 may reciprocate or move axially relative to the trunnion 32, the two will rotate in unison.

The adjusting shaft 30 is rotatably mounted in the trunnion 32 and in the hub 31 of the gear 15 and is free to rotate relative thereto. Adjacent its lower end this adjusting shaft 30 is provided with an eccentric 34 mounted in a complemental bore 35 in the socket 14. The socket 14 as illustrated is mounted in a radial slot 14a in the gear 15 so that it may be moved radially relative to the gear. By revolving the eccentric 34, the radial position of the socket 14 with respect to the center of the gear 15 will be varied, and as this socket is engaged by the crank arm 12 of the piston 10, the stroke of the piston will depend upon the radial position of the socket 14. Consequently, by turning the adjusting shaft 30, the displacement of the meter will be varied.

It is thus seen that by turning the pointer shaft 19, that endwise movement will be imparted to the plunger 24, which in turn will impart endwise movement to the actuator sleeve 25. This endwise movement will be translated into turning movement of the adjusting shaft 30 due to the engagement of the helical splines 28 with the helical grooves 27. This turning of the adjustment shaft 30 will adjust the radial position of the socket 14 with respect to the center of the gear 15, and consequently vary the displacement of the meter.

In operation of the device, it should be stated that the relationship between the pointer and the socket 14 is such that when the pointer is aligned with the calibration 60 on the scale 18, that the meter will deliver the exact gallonage indicated on the counter of the meter. However, assuming that one thousand gallons of gasoline is ordered and that the temperature of the gasoline to be delivered is say eighty degrees, the knob 21 is manipulated to place the pointer 20 in register with the calibration 80 on the scale 18. When this is done, the dial shaft 19 will be revolved, turning the pinion 22 which in turn will raise the plunger 24 and consequently the actuator sleeve 25. This movement of the actuator sleeve will be translated into rotary movement of the adjusting shaft 30 through the helical splines 28 which engage the helical grooves 27 in the actuator sleeve 25. This turning movement of the shaft 30 will adjust the position of the eccentric 34 and lengthen the stroke of the piston 10 due to increasing the distance between the center of the socket 14 and the center of the gear 15, consequently increasing the displacement of the meter to a point where it will displace more volume than that indicated on the counter of the meter. The additional amount displaced will be that which is necessary to compensate for the expanded condition of the fluid so that when the temperature thereof decreases to sixty degrees, it will be exactly one thousand gallons, which amount will be indicated on the counter of the meter.

In the event that the temperature of the gasoline to be metered is less than sixty degrees, the knob 21 is turned until the pointer 20 registers with the calibration on the scale 18 agreeing with the temperature of the gasoline. This turning movement of the knob through the shaft 19 and the pinion 22 lowers the plunger 24 and the sleeve 25 to turn the adjustment shaft 30 in the opposite direction, decreasing the stroke of the piston 10 so that the actual gallons delivered by the meter will be less than that indicated by the meter counter, the difference being sufficient to compensate for the contraction of the fluid so that when it reaches the temperature of sixty degrees, its volume will be exactly that indicated by the counter of the meter.

I should point out that when the meter is operating, the gear 15 is revolving, which revolves its hub 31 and the trunnion 32, likewise revolving the sleeve 25. During this time, of course, the adjustment shaft 30 is likewise revolving due to the engagement of the splines 28 with the grooves 27. However, no relative rotation between the shaft 30 and the gear 15 will take place unless there is endwise movement of the sleeve 25.

From the foregoing it is obvious that it is only necessary to determine the temperature of the liquid to be metered and then align the pointer 20 with this temperature reading on the scale 18 to adjust the meter to compensate for differences in the temperature of the liquid to be metered and the accepted average temperature. Thus, by my simple apparatus I am enabled to expeditiously and accurately calibrate a displacement type meter to compensate for the expansion or contraction of the liquid to be metered.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In combination with a meter having a reciprocable and oscillatory piston, said piston having a radial crank arm, a rotatable member, a crank arm socket carried by the latter at an eccentric point thereon and engaged by said crank arm, a turnable adjusting member operatively connected with said socket to adjust the radial position thereof and thereby vary the piston stroke, a fixed calibrated dial, a manually operative pointer member associated with said dial, an actuator sleeve, said sleeve having helical guide grooves formed therein, helical splines fixed to said adjusting member and engaging said guide grooves whereby axial movement of said actuator sleeve will impart turning movement to said adjusting member, and a connection between said actuator sleeve and said pointer whereby movement of the pointer will be translated into endwise movement of said actuator sleeve.

2. In combination with a meter having a reciprocable and oscillatory piston, said piston having a radial crank arm, a rotatable member, a crank arm socket carried by the latter at an eccentric point thereon and engaged by said crank arm, a turnable adjusting member operatively connected with said socket to adjust the radial position thereof, a fixed calibrated dial, a pointer shaft arranged concentrically of the dial, a pointer carried thereby for cooperation with the dial, an actuator sleeve arranged coaxially of the adjusting member, said actuator sleeve having a helical groove formed therein, a fixed helical spline on the adjusting member engaging said groove whereby endwise movement of the sleeve will cause turning movement of the adjusting member and adjustment of said socket, and an operative connection between said actuator sleeve and said pointer shaft whereby turning movement of the pointer shaft will be translated into endwise movement of the actuator sleeve.

3. In combination with a meter having a reciprocable and oscillatory piston, said piston having a radial crank arm, a rotatable member, a crank arm socket carried by the latter at an eccentric point thereon and engaged by said crank arm, an adjusting shaft arranged coaxially of the rotatable member and operatively associated with said socket whereby turning movement of said shaft will adjust the radial position of said socket with respect to the center of said rotatable member, a fixed dial, a pointer cooperating therewith, a rotatable pointer shaft on which said pointer is fixed, an actuator sleeve arranged coaxially of said adjusting shaft and into which said adjusting shaft projects, a helical groove in said actuator sleeve, a fixed spline on said adjusting shaft engaging said groove whereby axial movement of the actuator sleeve will cause turning of said adjusting shaft relative to said rotatable member, and an operative connection between said actuator sleeve and said pointer shaft whereby turning movement of the pointer shaft will result in axial movement of said sleeve.

4. In combination with a meter having a reciprocable and oscillatory piston, said piston having a radial crank arm, a rotatable member, a crank arm socket carried by the latter at an eccentric point thereon and engaged by said crank arm, an adjusting shaft arranged coaxially of the rotatable member and operatively associated with said socket whereby turning movement of said shaft will adjust the radial position of said socket with respect to the center of said rotatable member, a trunnion fixed to said rotatable member and through which said adjusting shaft projects, an actuator sleeve arranged coaxially of said adjusting shaft and trunnion and into which the same project, said actuator sleeve being formed interiorly with a helical groove, a fixed helical spline on said adjusting shaft engaging said groove, said actuator sleeve being formed interiorly with an axial groove, a fixed spline on said trunnion engaging said latter groove, a dial, a pointer member associated therewith, a pointer shaft to which said pointer is affixed, an operative connection between said pointer shaft and said actuator sleeve whereby turning movement of said pointer shaft will cause axial movement of said sleeve.

5. In combination with a meter having a reciprocable and oscillatory piston, said piston having a radial crank arm, a rotatable member, a crank arm socket carried by the latter at an eccentric point thereon and engaged by said crank arm, an adjusting shaft arranged coaxially of the rotatable member and operatively associated with said socket whereby turning movement of said shaft will adjust the radial position of said socket with respect to the center of said rotatable member, a trunnion fixed to said rotatable member and through which said adjusting shaft projects, an actuator sleeve arranged coaxially of said adjusting shaft and trunnion and into which the same project, said actuator sleeve being formed interiorly with a helical groove, a fixed helical spline on said adjusting shaft engaging said groove, said actuator sleeve being formed interiorly with an axial groove, a fixed spline on said trunnion engaging said latter groove, a dial, a pointer member associated therewith, a pointer shaft to which said pointer is affixed, a plunger, a rack formed on said plunger, a swivel connection between the end of said plunger and one end of said actuator sleeve, a pinion fixed on the pointer shaft and in mesh with said rack whereby turning movement of the pointer shaft will result in axial movement of said actuator sleeve.

ALBERT J. GRANBERG.